(12) United States Patent
Elia et al.

(10) Patent No.: US 9,162,263 B2
(45) Date of Patent: Oct. 20, 2015

(54) BARGE SYSTEM FOR HYDRAULIC SPREADING OF AQUATIC CAPPING MATERIAL

(71) Applicant: Sevenson Environmental Services, Inc., Niagara, NY (US)

(72) Inventors: Michael C. Elia, Burt, NY (US); Timothy M. Donegan, Severna Park, MD (US); Michael D. Crystal, Youngstown, NY (US); Wayne A. Kostuk, Wilson, NY (US)

(73) Assignee: Sevenson Environmental Services, Inc., Niagara Falls, NY (US)

( * ) Notice: Subject to any disclaimer, the term of this patent is extended or adjusted under 35 U.S.C. 154(b) by 0 days.

(21) Appl. No.: 13/723,682

(22) Filed: Dec. 21, 2012

(65) Prior Publication Data
US 2013/0164083 A1    Jun. 27, 2013

Related U.S. Application Data

(60) Provisional application No. 61/579,486, filed on Dec. 22, 2011.

(51) Int. Cl.
*B09B 5/00* (2006.01)
*B09C 1/00* (2006.01)
*B09B 1/00* (2006.01)

(52) U.S. Cl.
CPC . *B09C 1/00* (2013.01); *B09B 1/002* (2013.01); *B09B 1/004* (2013.01); *Y02W 30/32* (2015.05)

(58) Field of Classification Search
CPC .............................. E02D 15/10; E02B 3/121
USPC .......................... 405/128.45, 16, 17; 114/26
See application file for complete search history.

(56) References Cited

U.S. PATENT DOCUMENTS

| 4,138,657 | A | | 2/1979 | Shave |
| 4,352,590 | A | * | 10/1982 | Parker et al. .................... 405/17 |
| 4,759,664 | A | * | 7/1988 | Deal ........................ 405/258.1 |
| 5,150,986 | A | | 9/1992 | Rohr |
| RE35,535 | E | | 6/1997 | Brumley et al. |
| 5,775,836 | A | | 7/1998 | Dean, Jr. |
| 6,343,559 | B1 | | 2/2002 | Thomas |
| 6,817,119 | B2 | * | 11/2004 | Kerfoot ........................... 37/323 |
| 7,695,215 | B2 | * | 4/2010 | Buhr et al. ...................... 405/17 |
| 7,751,977 | B2 | * | 7/2010 | Winkler et al. ................... 702/3 |

\* cited by examiner

*Primary Examiner* — Doug Hutton, Jr.
*Assistant Examiner* — Patrick Lambe
(74) *Attorney, Agent, or Firm* — Hoffmann & Baron, LLP

(57) ABSTRACT

A barge system for hydraulic spreading of aquatic capping material is provided. The barge system includes a barge, a piping system, a spreader, a system for moving the barge and a controller. The barge has a deck extending between a front end and a rear end and two opposing sides. The piping system is mounted on the deck and used for the transmission of capping material slurry that includes a capping material. The piping system has a first end and a second end. A source of capping material slurry is connected to the first end and fed through the piping system to the spreader. The spreader has an inlet end in communication with the second end of the piping system and a discharge end. The spreader evenly distributes the capping material slurry from the end of the barge. The controller positions the barge based on the flow rate and density of the slurry. The barge system is used to deposit a predetermined thickness of the capping material on the bottom of the body of water.

29 Claims, 13 Drawing Sheets

BARGE SYSTEM FOR HYDRAULIC SPREADING OF AQUATIC CAPPING MATERIAL

This application claims priority from provisional application Ser. No. 61/579,486, filed on Dec. 22, 2011, which is incorporated herein in its entirety.

FIELD OF THE INVENTION

The present invention is a barge mounted system for uniformly spreading aquatic capping material on the bottom of a body of water. In particular, the present invention relates to a barge mounted system for uniformly spreading aquatic capping material on the bottom of a body of water by controlling the composition of the capping material and the location of the barge.

BACKGROUND OF INVENTION

The pollution of lakes, rivers and costal waters by the unregulated discharge and dumping of industrial, agricultural and municipal wastes has severely damaged the environment. In some cases, the waters have been so seriously impacted that they can no longer support aquatic life or the fish and crustaceans that reside in the waters are no longer safe for human consumption.

The Clean Water Act of 1972 and other similar legislation have established goals for eliminating releases of high amounts of toxic substances into waters and ensuring that surface waters meet certain standards. In addition to limiting the current discharge of pollutants, an effort has been made to remediate lakes, rivers and other bodies of water that have been identified as particularly hazardous to the environment and the health of humans. The remediation can include some form of dredging to remove pollutants that have settled to the bottom of the bodies of water and mixed in with the natural mud and sediments. The amount of material that must be removed can vary from several inches to several feet at different sites. In most cases, the pollutants have migrated so deep into the mud and sediments that it is impractical to entirely remove them. Therefore, dredging is conducted until the pollutants in the dredged materials are determined to be present at a safe level. However, even at safe levels, it is desirable to prevent the pollutants from mixing with the water. Therefore, an aquatic cap material is spread over the bottom of the dredged body of water to act as a barrier between the pollutants in the sediments and the water. In some instances, capping is the only remediation that is required to isolate and trap the pollutants.

The aquatic capping systems that are currently being used do not adequately control the composition of the aquatic capping materials so that it is necessary to deposit a thicker layer of cap material on the bottom of the body of water to ensure that the cap provides a sufficient barrier. In addition, the position of the barge or boat discharging the aquatic capping material and the aquatic cap material discharging apparatus presently being used do not spread a uniform layer of the aquatic capping material on the bottom. This also results in a thicker layer of aquatic capping material being placed on the bottom to ensure a minimum layer thickness. Accordingly, there is a need for an aquatic capping system that can control the composition of the aquatic capping material and provide a layer of aquatic capping material with a highly uniform thickness.

SUMMARY OF THE INVENTION

In accordance with the present invention, a barge system for hydraulic spreading of aquatic capping material is provided. The barge system includes a barge, a piping system, a spreader, a system for moving the barge and a controller. The barge has a deck extending between a front end and a rear end and two opposing sides. The piping system is mounted on the deck and used for the transmission of capping material slurry that includes a capping material. The piping system has a first end and a second end. A source of capping material slurry is connected to the first end and fed through the piping system to the spreader. The spreader has an inlet end in communication with the second end of the piping system and a discharge end. The spreader evenly distributes the capping material slurry from the end of the barge. The controller controls the system for moving the barge to position the barge. The barge system is used to deposit a predetermined thickness of the capping material on the bottom of the body of water.

The barge system can also include a density meter, a flow meter and a global positioning system. The density meter measures the density of the capping material slurry in the piping system and transmits an electronic signal corresponding to the measured density to the controller. The flow meter measures the flow rate of the capping material slurry through the piping system and transmits an electronic signal corresponding to the measured flow rate to the controller. The global positioning system continuously determines the location of the barge, preferably in real time, and transmits an electronic signal corresponding to the location to the controller.

The controller receives the electronic signal from the density meter, the flow meter and the global positioning system and performs a calculation to determine the amount of capping material slurry discharged from the spreader and the amount of capping material deposited in an area of the bottom of the body of water. The controller controls the system for moving the barge based on the amount of capping material slurry discharged and the location of the barge as determined by the global positioning system.

The controller can include software for mapping the body of water, monitoring the location of the barge and recording the amount and location of the capping material deposited on the bottom of the body of water. A device for measuring a speed and a direction of a current in the body of water can also be used to transmit one or more electronic signals corresponding to the speed and direction of the current to the controller. The speed and the direction of the current can be used as a factor in the controller calculation for the determining the amount of capping material slurry discharged and the amount of capping material deposited on the bottom of the body of water.

An operator interface device is used by an operator to interface with the controller. The operator interface device can be a touch screen display, a computer monitor and keyboard, a control panel, a laptop computer, a mobile phone or a personal digital assistant. The operator can also interface with the controller from a remote location using a wireless device.

The system for moving the barge can include a plurality of hydraulic winches for operating cables affixed to immovable objects. Retracting and extending the cables using the plurality of winches changes the location of the barge. In another embodiment, the system for moving the barge includes one or more propellers connected to one or more inboard or outboard engines.

The spreader includes a base plate extending between a first end and a second end, a pair of opposing side walls, a top plate that defines an interior and a plurality of inlet connections on the first end connected to the plurality of discharge connections of the piping manifold. The discharge end extends from the front end or rear end of the barge. Since the barge traverses an area in forward and backward directions as it discharges the capping material slurry, the description of the ends of the barge as front and rear is arbitrary. The capping material slurry passes through the spreader and is discharged at the second or discharge end. The second end of the spreader can include an elongate orifice through which the capping material is discharged. The elongate orifice has a width and a height and the ratio of the width to the height is preferably greater than 4:1, more preferably greater than 10:1 and most preferably greater than 15:1. The interior of the spreader can include a plurality of passages extending from the first end to a point intermediate the first end and the second end.

The discharge end of the spreader preferably extends from the rear end of the barge and can extend below the surface of the body of water. In one embodiment, the spreader includes a chassis for supporting the spreader on the bottom of the body of water. One or more flexible pipes transport capping material slurry from the barge to the spreader. The chassis can be connected to one or more wheels or tracks to provide movement and it can include an electric or pneumatic propulsion unit. The discharge end of the spreader can include an elongate orifice through which the capping material is discharged.

The piping system has a first section that includes first end, a second section that includes the second end and a U-shaped intermediate section disposed between the first and second sections. The first and second sections are substantially parallel to the deck and the U-shaped intermediate section extends upwardly from the deck and is substantially perpendicular to the first and second sections. The source of capping material slurry is connected to the first end and travels up the downstream leg of the U-shaped section and down the downstream leg. The density meter and the flow meter are installed in the U-shaped intermediate section, preferably in the upstream leg.

The barge system can also include a piping manifold connecting the second end of the piping system to the inlet end of the spreader. The piping manifold includes an inlet connection and a plurality of discharge connections connected to the plurality of inlet connections on the spreader. The manifold can include one or more valves for regulating the flow of the capping material slurry to the plurality of discharge connections.

BRIEF DESCRIPTION OF THE FIGURES

The preferred embodiments of the barge system for hydraulic spreading of aquatic capping material of the present invention, as well as other objects, features and advantages of this invention, will be apparent from the accompanying drawings wherein.

DETAILED DESCRIPTION OF THE INVENTION

Figure 1:
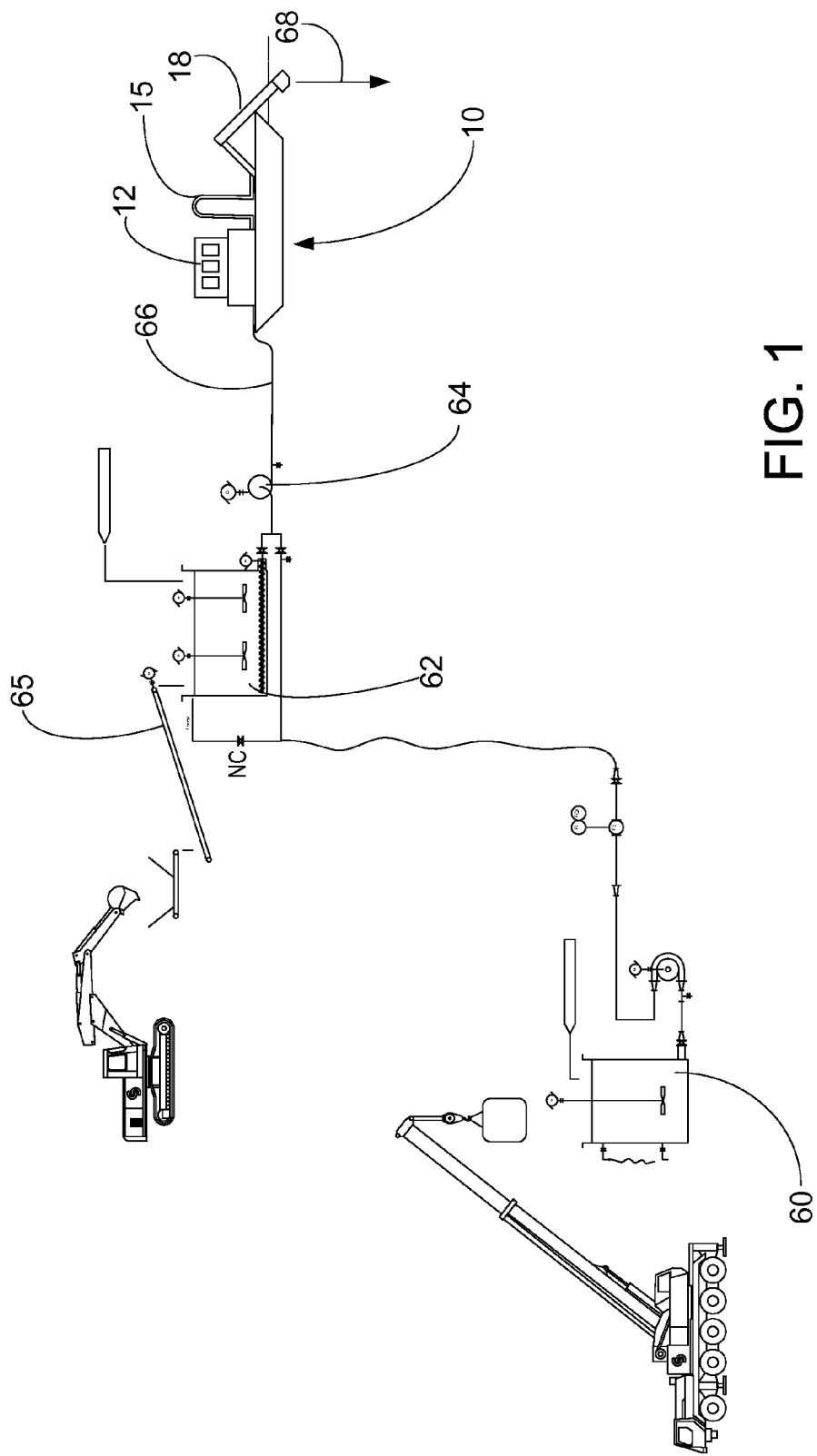
FIG. 1 is a schematic of the preparation and loading of aquatic capping material slurry onto a preferred embodiment of the barge system.

The present invention is a barge system for hydraulic spreading of aquatic capping material slurry on the bottom of a body of water. The automated barge system facilitates even hydraulic spreading of silts, sands, gravel, soil, different types of clay, granular or powdered activated carbon, other materials and/or mixtures thereof. The scope of the invention is not limited by the type of material that is spread by the system. The present invention contemplates spreading any type of material that can be mixed in a pumpable slurry (i.e., a slurry that can be pumped through a pipe).

The barge system preferably includes a barge, a piping system mounted on the barge for transporting an aquatic capping material slurry, a spreader for evenly distributing the aquatic capping material slurry on the bottom of a body of water, a device for measuring the density of the aquatic capping material slurry in the piping system, a device for measuring the flow rate of the aquatic capping material slurry through the piping system, a global positioning system for continuously determining the real time location of the barge, a propulsion system for moving or maintaining the barge in a desired location, and a controller.

The plurality of hydraulic winches operates a plurality of cables affixed to immovable objects. Retracting and extending the cables using the plurality of winches controls the location of the barge. When circumstances make cables and winches impractical, the barge can be self-propelled and a variety of well know propulsion systems can be used to move or maintain the position of the barge. Alternatively, an auxiliary vessel can be used to position the barge.

The controller calculates the amount of capping material slurry discharged from the spreader based on the density and flow rate of the capping material slurry. The controller also positions the barge based on the amount of capping material slurry discharged and the position of the barge based on the location of the barge as determined by the global positioning system. The controlled spreading of the capping material slurry allows a predetermined thickness of capping material to be deposited on the bottom of a body of water.

The main components of the system are the capping material slurry preparation system and the barge spreader system. The capping material slurry preparation system includes a loading hopper and conveyor, a slurry mix system for combining sand, water, and other materials, a dredge style booster pump, a dredge pipeline that connects the slurry system to the barge, and a slurry water make-up pump for injecting water into the slurry mix system. The basic components of the barge system include a barge, a piping system mounted on the barge, a spreader for distributing the capping material slurry and a piping manifold for connecting the piping system to the spreader. The barge system can also include a computer control system and spreader barge system control software, which are referred to herein collectively as the "controller." In addition, a global positioning system ("GPS"), nuclear density meter, and flow meter can also be provided.

The controller preferably includes a computer or processor with sufficient software and memory to store programs and data, perform the functions detailed herein and facilitate Internet connectivity. The controller interface device can include a display, monitor (preferably a touch screen monitor), keyboard and mouse for use by an operator on the barge. The controller can also be accessed remotely by a wireless connection using radio, cell phone or satellite technology.

The barge can be any type of barge that has dimensions suitable for supporting the piping system, the piping manifold system and the spreader, as well as other miscellaneous equipment, such as a generator for providing electrical power and compressors for operating hydraulic system(s) and providing compressed air. The barge can also include an enclosure for the controls and for sheltering personnel. In a preferred embodiment, the barge has winches that are used to move the barge to different locations. The density meter and flow meter for measuring the density and flow, respectively, of the capping material slurry are preferably installed in a U-shaped section of the piping system. The global positioning system can be installed on the barge in the operator enclosure to provide the real time location of the barge.

The barge piping system is connected to a feed line that transports capping material slurry from a location on land via a dredge pipeline or from a nearby vessel. As used herein, the term "dredge pipeline" refers to the type of pipeline that is typically used in dredging operations to pump dredged material from a point off-shore to a vessel or a discharge point near or on-shore. The piping system can be rubber lined and has a diameter sufficient to accommodate the amount of capping material slurry that is desired to be discharged via the spreader. The diameter of the piping system can vary depending on the dimensions and capacity of the spreader. Preferably, the piping system has an inverted U-shaped section that rises above the deck of the barge. The U-shaped section can be used for installing flow meters and density meters. The preferred flow meters are magnetic flow meters that measure the flow through the meter using a magnetic field that varies proportionally to the flow rate. The preferred density meters are nuclear density meters that are attached to the exterior of the pipe with a radiation source on one side and a detector on the other side. The amount of radiation measured at the detector is dependent upon the shielding provided by the capping material slurry in the pipe. These types of flow meters and density meters are well known to those skilled in the art and are readily available from several manufacturers. However, the invention is not limited by the types of flow meter and density meter that are used and other types known to those skilled in the art can also be used.

The spreader is a substantially rectangular structure having two side walls, a closed end, and an open discharge end defining a base plate extending therebetween and a top plate extending from the closed end to about midway between the closed and open ends. The top and base plates and the two side walls form a chute for discharging the capping material slurry from the open end of the spreader. In one embodiment, the top plate extends between the two ends and, together with the base plate and two side walls, forms an orifice at the discharge end of the spreader. In a preferred embodiment, the chute is divided into a plurality of passages that extend from the closed end to about midway between the closed and open ends. This helps to ensure that the capping material slurry is evenly discharged along the width of the spreader.

The spreader extends outwardly from one of the ends of the barge and is designed to receive the capping material slurry and discharge it evenly through an orifice that can have a width of from 12 to 30 feet or more. The spreader can have a plurality of inlet connections, which are located at substantially equal intervals along the first end (also referred to herein as the inlet end), for receiving and evenly conveying the capping material slurry onto the base plate of the spreader. In a preferred embodiment, the plurality of inlet connections is in communication with a plurality of passages in the spreader that that evenly distribute the capping material slurry across the width of the spreader. The discharge end of the spreader can extend from the front end or rear end of the barge, as the terms are relative to the direction the barge is moving back and forth across the surface of the body of water. In some embodiments, the discharge end of the spreader can be positioned below the surface of the body of water. In another embodiment, the spreader can be mounted on a chassis and moved along the bottom of the body of water. The capping material slurry discharged from the spreader can be monitored by one or more cameras mounted on the barge or the spreader with one or more monitors in the control house on the barge. The cameras can also be monitored from other locations on a desk top or laptop computer, a personal digital assistant or cell phone over a closed circuit network or a wireless local area network.

The piping manifold system has an inlet connected to the second end of the piping system and a plurality of discharge connections that are connected to the plurality of spreader connections. The piping manifold distributes the capping material slurry so that a substantially uniform amount is discharged from the spreader along the entire width of the discharge end. From the inlet connection, the pipe of the piping manifold can branch (or split) into two pipes and the two pipes can branch into two more pipes. This branching continues until the number of branches corresponds to the number of inlet connections on the spreader. To ensure the even distribution of the capping material slurry, the piping manifold system can include one or more manual or automatic valves that can be adjusted to regulate the flow of capping material slurry to the connections on the spreader. The valves are the type that can be used with slurries, such as pinch valves, rubber lined butterfly valves, knife-gate valves, diaphragm valves and other similar valves that are well known to those skilled in the art. These valves can be provided with pneumatic or electric actuators so that they can be automatically controlled from the controller or they can be manually operated.

The GPS sends a signal to the controller, which allows the operator to continuously monitor the precise location of the barge system so that the barge can be positioned at a desired location. The nuclear density meter measures the density of the slurry being pumped to the spreader. The flow meter measures the velocity of the slurry passing through the pipe. Electronic signals corresponding to the density and the flow rate of the slurry are sent to the controller so that the exact amount of solid materials discharged from the spreader can be determined. The controller uses this information to calculate the length of time the spreader discharges aquatic capping material slurry at a specific location to achieve a desired aquatic capping material thickness on the bottom of the body of water. The location of the barge, as determined by the GPS, is used to move the barge by controlling its speed and direction.

The barge can be provided with a propulsion system that can include one or more engines, a plurality of hydraulic winches affixed to the deck of the barge or a combination thereof for movement on the surface of the body of water. The engines can be inboard engines or external engines attached to the sides of the barge or located on another vessel, such as a tugboat. Propulsion systems for barges are well known to those skilled in the art and the present invention is not limited by the propulsion system that is used for moving the barge. The winches are automatically controlled by the controller. Preferably, four steel cables are secured to cable guides at fixed locations—two in the front and two in the rear of the barge—and the hydraulic winches are used to position the barge by winding and/or unwinding the cables. In a preferred embodiment, the cable guides can be pivoted—either manually or automatically by the controller—to redirect the cable. Using the winches and cables, the controller can accurately position the barge and control its movement so that the spreader can evenly discharge silt, sand, dirt, gravel and other aquatic capping materials at a predetermined thickness over a designated area of the bottom of the body of water.

In a preferred embodiment, the barge advances using four hydraulic winches with cable spools that hold approximately 500 to 1,000 feet of cable. The velocity/flow meter and nuclear density meter for measure the flow rate and density, respectively, of the aquatic capping material slurry. The system evenly distributes the surface release of aquatic capping material slurry or distributes the capping materials slurry from a submerged spreader. The density meter is used to determine the specific gravity (SG) of the aquatic capping material slurry. The specific gravity can then be used to calculate the dry volumetric equivalent of aquatic capping materials (i.e., dry volume sand, gravel, etc.) that are discharged by the spreader. The discharge end of the spreader can be inclined and located at the rear of the barge or it can be submerged below the surface of the water. When the system is used in bodies of water with fast moving currents or with depths of more than 10 feet, the spreader can be supported by a wheeled or tracked chassis or sled that moves along the bottom of the body of water. In a preferred embodiment, the spreader discharge end (inclined or submerged) makes an even distribution between 12 and 30 feet wide, preferably between 15 and 25 feet wide. However, the spreader can have a narrower or wider discharge end by altering the size of the spreader and piping dimensions as one skilled in the art would readily understand.

The GPS, preferably a Real Time Kinematic Global Positioning System (RTK GPS), continuously tracks the location of the barge. The location is sent as an electronic signal from the GPS to the controller. The barge system can be operated manually or automatically with pre-programmed paths as the controller continuously monitors and records in an historic archive the locations of the paths and the amounts and locations of the aquatic capping materials deposited. As previously described, the barge can be positioned using engines or it can pull itself along a set path using the cable system. The controller allows the operator to override the automatic control mode and use a joy stick in manual mode to position the barge. In manual mode, the control monitor has left and right indicators, which indicate to the operator whether or not the barge is maintaining the predetermined programmed path. In manual mode, the controller also has a speed indicator that tells the operator to speed up or slow down (similar to the left-right indicator but for forwards or backwards) in order to deposit aquatic capping materials on the bottom of the body of water at the application rate programmed into the controller to provide a predetermined thickness (e.g., a four inch thickness) of capping material on the bottom. The barge can operate in forward and backward directions along the predetermined paths. It also can move in a lateral or diagonal direction, which allows for an accurate transition from one path to another.

The controller in automatic mode (or the operator in manual mode) controls the thickness of the aquatic capping material deposited on the bottom by controlling the length of time that the barge "sits" in a specific location and the rate of movement of the barge through the water. For example, if the remediation plan requires the barge system to deposit a 4-inch cap in one spot and then deposit an 8-inch cap in the next location, the speed of the barge is varied based on the concentration and the feed rate of the capping material slurry in the slurry line. The controller can also be programmed to operate the barge at a predetermined rate of movement, e.g., feet per minute (ft/min) advancement rate, cubic yards per hour (CY/hr) advancement rate or a material thickness advancement rate inches per hour (in/hr).

The controller can include a function that allows the operator to compensate for the current and/or depth of the water. For example, less aquatic capping material will be deposited on a targeted location on the bottom of a river with a fast current compared to a pond or lake with little or no current, since the current will carry some of the aquatic capping material away from the targeted location. Deeper bodies of water can also experience a similar dispersion of the aquatic capping material. The operator accounts for the aquatic capping material that drifts away from the targeted location by entering a factor into the controller of from 1 to 10. For example, when there is little or no current and the depth of the water is less than 10 feet, the factor may be 1.0 and, when there is a current or the depth of the water is in excess of 10 feet, the factor may be greater than 1.0. If the current is significant, it may be necessary to spread twice as much aquatic capping material on a targeted location and the factor would be 2.0 or more.

The speed and direction of the current can be measured and sent to the controller via an electronic signal by a device attached to the barge or submerged in the body of water at a fixed location in the vicinity of the barge. One device that can be used is an electromagnetic current meter ("ECM"), which senses horizontal current flow along two axes perpendicular to each other. The typical ECM measures current by inducing a magnetic field around a spherical sensor head. The electromotive force that results from a conductor (i.e., water) moving through the field is then measured. A variety of different impeller-type (Model 102) and electromagnetic (Model 803 ROV) water current measurement meters, as well as open channel flow meters (Models 001 and 002) are available from Valeport, Totnes, the United Kingdom. All of these meters send electrical output signals to the controller.

An acoustic Doppler meter ("ADM") that determines flow along three perpendicular axes can also be used. The principle involved in an ADM is the sensing of Doppler-shifted frequency in acoustic signals bounced back from moving water particles. A current measurement can be given either as a flow speed (e.g., knots or m/sec) and a direction in which the current is moving (usually a heading given in degrees measured clockwise from true north) or as two separate flow speeds (U and V) measured along two orthogonal axes. Typically, the axes are oriented such that U represents the horizontal component of flow in the east-west direction while V represents the horizontal component in the north-south direction. ADM systems are disclosed in U.S. Pat. No. 8,125,849 to Cabrera, U.S. Pat. No. 7,751,977 to Winkler et al., U.S. RE35535 to Brumley et al. and U.S. Pat. No. 4,138,657 to Shave, all of which are incorporated herein by reference. Acoustic doppler meters are available from ASL Environmental Sciences of Victoria, British Columbia, Canada and Fondriest Environmental, Inc., Beavercreek, Ohio. A three-dimensional acoustic current meter by Falmouth Scientific, Inc. of Cataumet, Mass. can also be used. In addition, ultrasonic devices can be used to measure the flow rate of the current, e.g., U.S. Pat. No. 5,952,583 to Chang.

Current meters can be attached to moored buoys to measure the flow and direction of water past the sensor. This can provide surface information about the current and further instruments can be attached to the cable to measure the current at various depths. In addition, a device called a moored profiler that can climb up and down the mooring cables measuring the whole range of salinity, temperature and current. Such systems are available from McLane Research laboratories, Inc. of East Falmouth, Mass. River surface currents can also be measured using coherent microwave systems.

The controller can include software for computer mapping (e.g., Geographic Information Systems ("GIS") applications) a body of water based on the latitude and longitude. The computer mapping digitally creates and "manipulates" spatial areas to monitor the location of the barge and the amount of capping material deposited on the bottom of the body of water. The software allows the controller to integrate, store, edit, analyze, share, and display geographic information for the barge system. In addition, the software allows the user to create interactive queries (user-created searches), analyze spatial information, edit data in maps and graphically present the results of all the barge system operations. A preferred software program is "Maptitude" sold by Caliper Corporation, Newton, Mass., which allows the user to view, edit and integrate maps. The software and technology are designed to facilitate the geographical visualization and analysis of data relating to the barge system operations.

The operator communicates with the controller via an operator interface device to control the location of the barge and the discharge of the capping material slurry. The operator interface device also allows the operator to continuously monitor the flow rate and density of the capping material slurry and the amount of capping material deposited and to control the system for moving the barge. A second operator interface device can be provided for monitoring the progress of the barge system, accessing information relating to the locations and amounts of capping material slurry discharged and for generating reports. The controller can be remotely accessed using a wireless connection so that the operator can monitor the process and make changes to the operating instructions. The controller can be remotely accessed from a desk top or laptop computer or from a personal digital assistant ("PDA"). As used herein, the phrase "personal digital assistant" refers to any small mobile hand-held device that provides computing and information storage and retrieval capabilities, including note pads, such as the Apple, Inc. iPad©, as well as mobile phones.

The controller is preferably interfaced using a touch screen display. However, other types of operator interface devices well know to those skilled in the art can be used with the controller, such as a monitor and keyboard, and they are within the scope of the present invention. The screen can have a variety of different graphic displays that can be called up and viewed by the operator. The displays can be programmed to show the area that is being remediated, preferably using a grid to identify different areas, so that the operator can easily monitor the progress of the deposition of the aquatic capping material. The different areas in the grid change colors based on the programmed thickness and the amount of aquatic capping material deposited for each path (also referred to herein as "line" or "lane") the barge traverses. The screen color (matrix) changes as material is spread on the bottom of the body of water. Preferably, a color code system with three different colors is used, wherein red indicates an untreated area, yellow indicates that spreading is in progress and green indicates an area where the spreading of the aquatic capping material is complete. The changing colors on the screen make it easy for the operator to monitor the progress of the spreading operation when the controller is in manual mode and allow the operator to estimate how fast the barge needs to move when the controller is in manual mode.

The barge system is modular and can be assembled and disassembled on project sites. The barge can have a hydraulic power pack to operate the four winches and a generator to supply electrical power. The spreader system on the barge is fed a mixture of water, sand, soil, gravel, additives and/or other materials (referred to herein collectively as "the capping material slurry" or "the slurry" or "the sand slurry" or "the sand mixture") from the shore or from another barge. One or more hoppers and one or more weight belt systems in the hydraulic slurry system are used to make-up the desired mixture of materials and one or more pumps feed the sand slurry to the barge for spreading on the bottom of the body of water.

The aquatic capping material slurry can include an additive dosage system that is designed to dose a precise amount of additive, such as granular activated carbon ("GAC"), into a sand slurry mixture before it is pumped to the spreader barge in the lake or other body of water. The barge system and spreader are used to place a uniform sand-additive mixture in one or more layers on the bottom of a body of water. The additive system can also be used for mixing siderite, rocks and various types of clays with the sand slurry. While the sand mixture is typically applied uniformly over the entire capping area, the amount of additive, such as GAC, deposited can vary significantly in different areas, depending upon the level of pollutants found in each area. The dosage rate for the additive can be varied while the amount of sand and other materials deposited in an area (e.g., 12 inches per sq. ft.) remains the same.

Activated carbon exists in 2 forms: granular activated carbon ("GAC") and powdered activated carbon ("PAC"). It has been determined through testing that PAC generates turbidity in the water column if applied in the aquatic capping operation. GAC was found to produce more acceptable results and is, therefore, preferred for use with the barge capping system.

It is important to deposit the precise amount of capping material on the bottom of the body of water to ensure regulatory compliance without the extra cost of over-applying the aquatic capping material in any area. One difficulty in applying the prescribed amount of additive in each area is the very large difference between the minimum additive application rate and the maximum rate. For some applications, the rate of additive addition ranges widely from a minimum rate of 32 pounds of additive per hour to a maximum rate of 32,600 pounds per hour. This represents a 1,000:1 system turndown, which is extremely challenging to provide with the needed accuracy over such a wide range of feed rates due to the limitations of the equipment. Typical equipment used for feeding additives have much smaller turndowns than required by the barge system. As an example, a typical weigh-belt feeder has a turndown of 100:1 at its design accuracy rate and a typical slurry metering pump has a turndown of 20:1, at its maximum accuracy.

One factor in the design is the need to soak some of the additives, such as carbon, in water for at least 3 hours prior to mixing with the sand slurry. The soaking time for carbon was found to be the minimum time necessary to "activate" the carbon, reduce its normal effervescence, and allow it to easily settle through the water column to the bottom of the body of water. For example, granular carbon is preferred over the powdered form because it settles to the bottom of the body of water more easily. Therefore, a key design consideration for additives, such as granular carbon, is to "handle" (convey, mix and/or pump) them in a way that avoids pulverizing them into powder and thereby creating turbidity problems and sand-additive cap uniformity problems on the bottom of the body of water.

The system is designed to accommodate a wide additive (carbon) feed range, a minimum carbon dosing time (preferably about 3 hours) and the need to preserve the integrity of the granular carbon. This is achieved by providing a system that preferably includes the following components: a dry carbon receiving station, a tubular drag conveyor to convey dry carbon to storage silos, one or more carbon storage silos with dust collectors, one or more weigh belt feeders, a tubular drag conveyor to convey a measured weight of carbon to one of the process tanks with mixers and one or more hose pump metering pumps and a controller, preferably a Supervisory Control and Data Acquisition ("SCADA") system, with one or more programs for controlling the operation of the slurry mixing system. Preferably, two controllers are used: one for the barge system and one for the slurry make-up system. However, when two controllers are used, the barge system controller is connected to the slurry make-up system controller (either by hard wires or a wireless connection) and can override the slurry make-up system controller.

The system has a dry additive receiving station, designed to receive dry additive, preferably GAC, siderite or organoclay. The dry additive can be conveyed via a tube conveyor (to minimize damage to the materials) to one or more silos where the carbon is stored. Material from one of the silos is fed by gravity to a weigh-belt feeder that weighs and meters additives at a prescribed rate via another tubular conveyor to one of the process tanks. Each tank has a mixer that mixes the additive and the sand slurry together. Preferably, three tanks are used in a revolving manner as follows: the first tank receives and mixes water and carbon to provide a specific concentration. When the predetermined concentration is achieved, the water and carbon feeds are shut off. The second tank soaks the carbon and water for an adjustable time, preferably ranging from 3 to 24 hours. The third tank has completed soaking and contains carbon and water at the prescribed concentration which is fed to the capping barge system for spreading on the bottom of the body of water. When the third tank is empty, it reverts to the role of the first tank and is refilled with carbon and water until the mixture concentration is reached. The second tank, having soaked the carbon for the prescribed period of time, then serves as the feed tank. The first tank, having been filled with the proper mixture, begins to soak the carbon. The rotation of the roles of the three tanks continues in the next cycle. All tank functions are controlled by the SCADA system.

The carbon/water mixture is metered to the capping barge by one or two pumps, such as hose pumps, which are specially designed pumps that can accurately pump heavy slurries. The different areas in a remediation project typically require different additive application rates. The barge system achieves these different rates by varying the carbon concentration in the tanks and by simultaneously varying the pumping rates. The flow and carbon quantity actually fed to each area are totalized on the SCADA system.

As the capping material slurry is discharged from the spreader, the density of the slurry is used to calculate the amount of material that is being deposited on the bottom of the body of water. The location, as determined by the GPS, and the speed and direction of the current are used by the controller to plot the amount of material deposited on the bottom at specific locations.

The barge system for hydraulic spreading of the capping material is now described as shown in the accompanying figures. In the embodiment shown in FIG. 1, a granular activated carbon slurry ("GAC") mixture is prepared in a first tank 60 and pumped to the capping material slurry make-up tank 62 where the capping material 65 is mixed with water to form a slurry. A slurry feed pump 64 then pumps the capping material slurry 66 through a pipe to the barge system 10.

Figure 2:
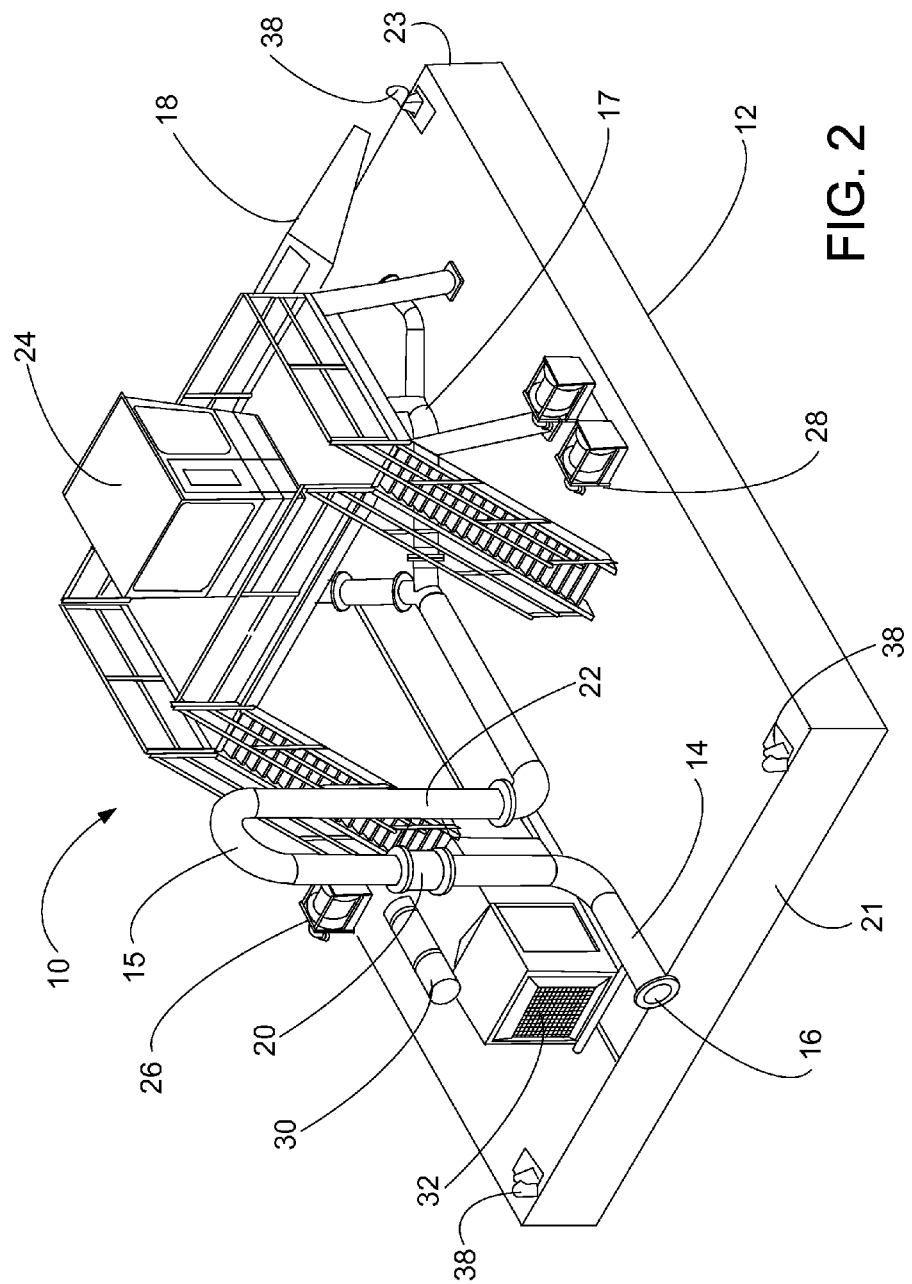
FIG. 2 is a front perspective view of a preferred embodiment of the barge system for hydraulic spreading of aquatic capping material slurry.
Figure 3:
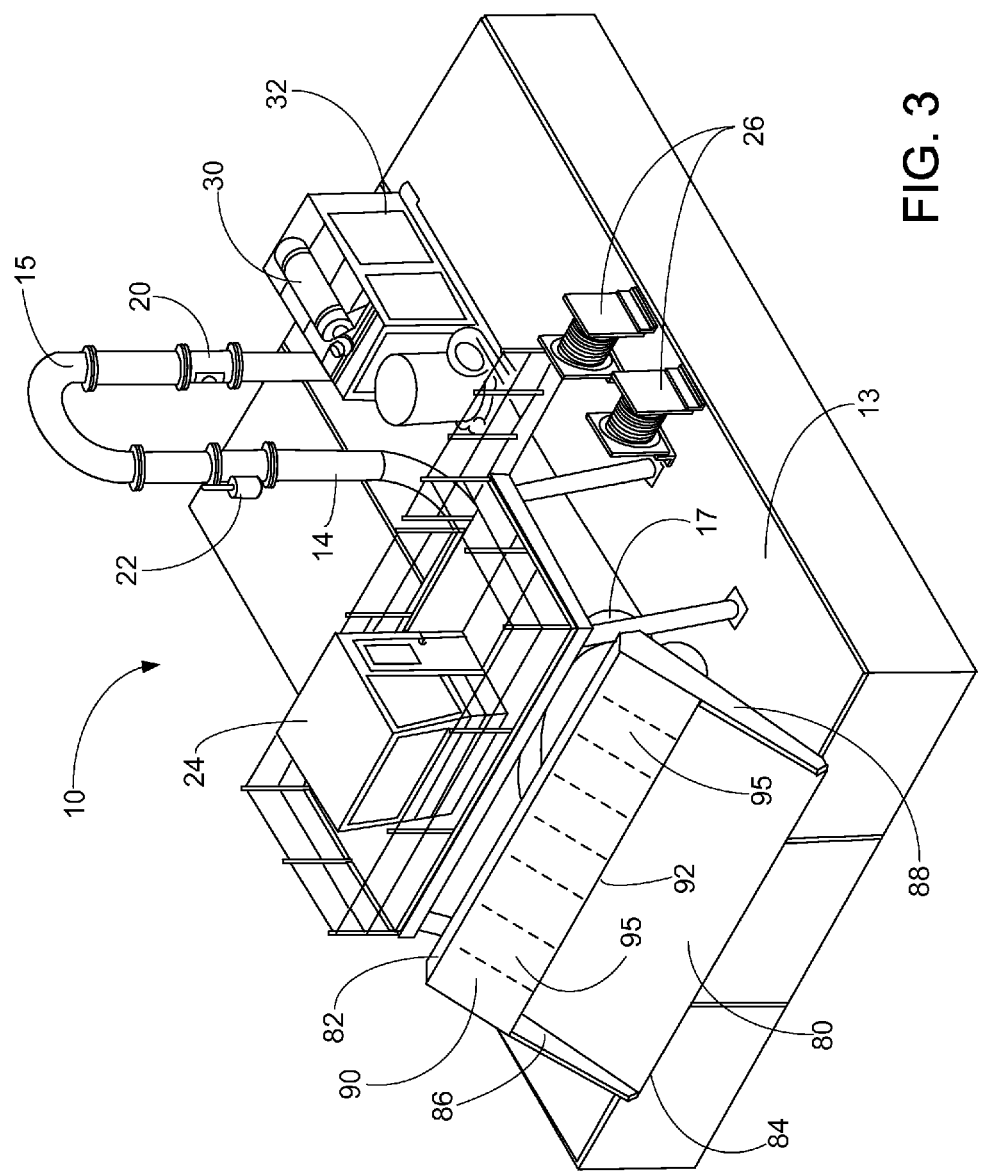
FIG. 3 is a rear perspective view of the barge system for hydraulic spreading of aquatic capping material slurry shown in FIG. 2.

FIGS. 2 and 3 show perspective views of the front and rear, respectively, of the barge system 10, which includes a barge 12 and a piping system 14 mounted on the deck 13 of the barge 12. The capping material slurry 68 is pumped from land or another barge (not shown) to the piping inlet 16 (FIG. 2) at the front end 21 of the barge 12 and then sent to the spreader 18 on the rear end 23 of the barge 12. A U-shaped piping section 15 extends upwardly from the deck 13 of the barge 12 and a flow measurement device 20 is installed in the upstream leg of the U-shaped piping section 15 and a density measurement device 22 is installed on the downstream leg of the U-shaped piping section 15; preferably, both devices 20, 22 are in/on the upstream leg so that the pipe is flooded at the measurement points. The U-shaped piping section 15 also serves to create a back pressure for the slurry pump 64. Two pairs of hydraulic winches 26, 28 are mounted on the deck 13 on either side of the barge 12. A tank 30 containing hydraulic fluid and one or more hydraulic pump(s) 32 is/are also mounted on the deck of the barge 12. The winches 26, 28 are used to position the barge 12, as described in more detail below. A control house 24 is located above the deck 13 of the barge 12 and the operator and the controls for operating the barge system 10 are located inside.

The spreader 18 has a substantially rectangular box-like shape and is formed by a base plate 80 extending between a first end 82 and a second end 84, a pair of opposing side walls 86, 88 and a top plate 90 that defines an interior 92 (FIG. 3). The spreader 18 can have a plurality of inlet connections 94 on the first end 82 connected to the plurality of discharge connections 96 of the piping manifold 17 (see FIG. 6). The manifold 17 distributes the capping material slurry 66 across the spreader 18 so that it is substantially evenly discharged into a plurality of passages 95.

Figure 4:
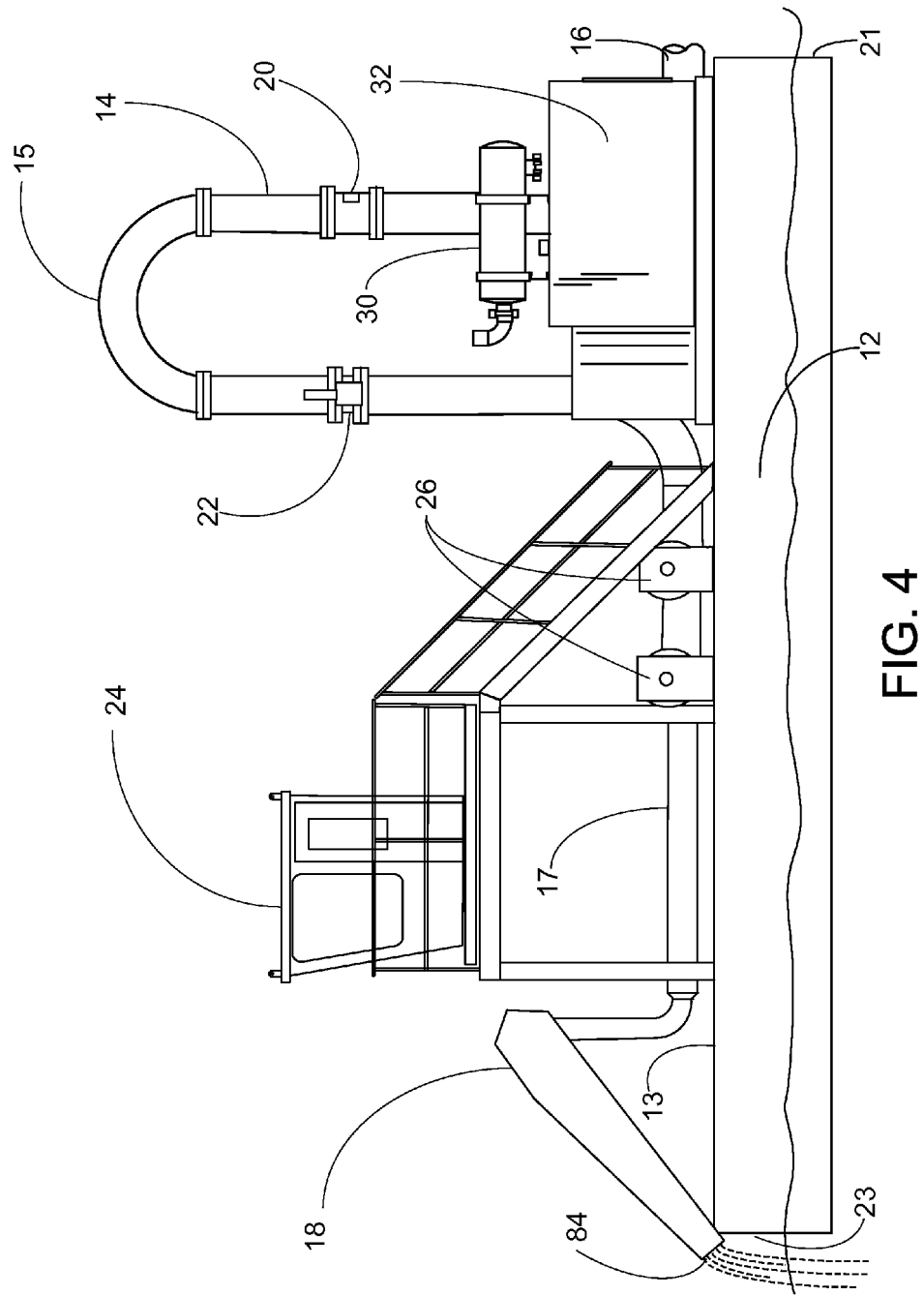
FIG. 4 is a right side view of the barge system for hydraulic spreading of aquatic capping material slurry shown in FIG. 2.
Figure 5:
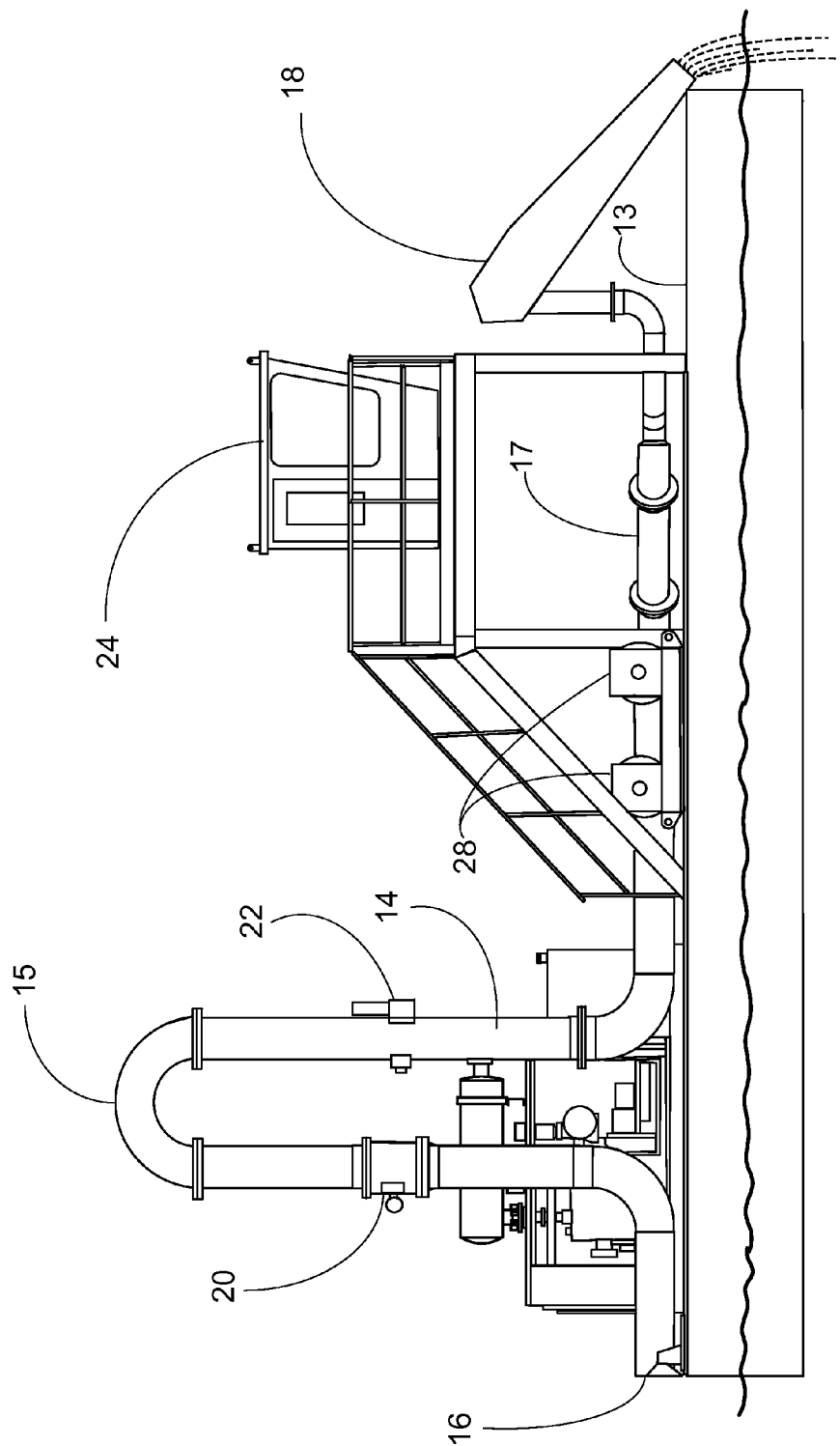
FIG. 5 is a left side view of the barge system for hydraulic spreading of capping material slurry shown in FIG. 2.

FIGS. 4 and 5 show the right and left sides, respectively, of the barge 12 with the piping inlet connection 16 for the capping material slurry 68 on the front end 21 of the barge 12 and the spreader 18 on the rear end 23. The U-shaped section 15 of the piping system 14 extends upwardly from the deck 13 of the barge 12. The capping material slurry 68 is pumped from shore or from an auxiliary barge (not shown) to the inlet connection 16 of the barge piping system 14 and then discharged at the discharge end 82 of the spreader 18 that evenly distributes the slurry 68. The spreader 18 is more than 6 feet in width at the point where it discharges the capping material slurry 68, preferably more than 12 feet and most preferably more than 18 feet. This allows the spreader 18 to distribute the capping material slurry 68 over a wide area. The piping system 14 has a manifold 17 (see FIG. 5) that distributes the capping material slurry 68 evenly along the entire width of the spreader 18.

The flow meter 20 and the density meter 22 are mounted in the U-shaped section 15 of the piping system 14, preferably in the upstream leg of the U-shaped section 15. The output signals from the flow meter 20 and the density meter 22 are sent to the controller 54 (FIG. 13) and used to determine the amount of capping material 65 in the capping material slurry 68. Based on the amount of capping material 65 that is being discharged, the controller 54 controls the movement of the barge 12.

Figure 6:
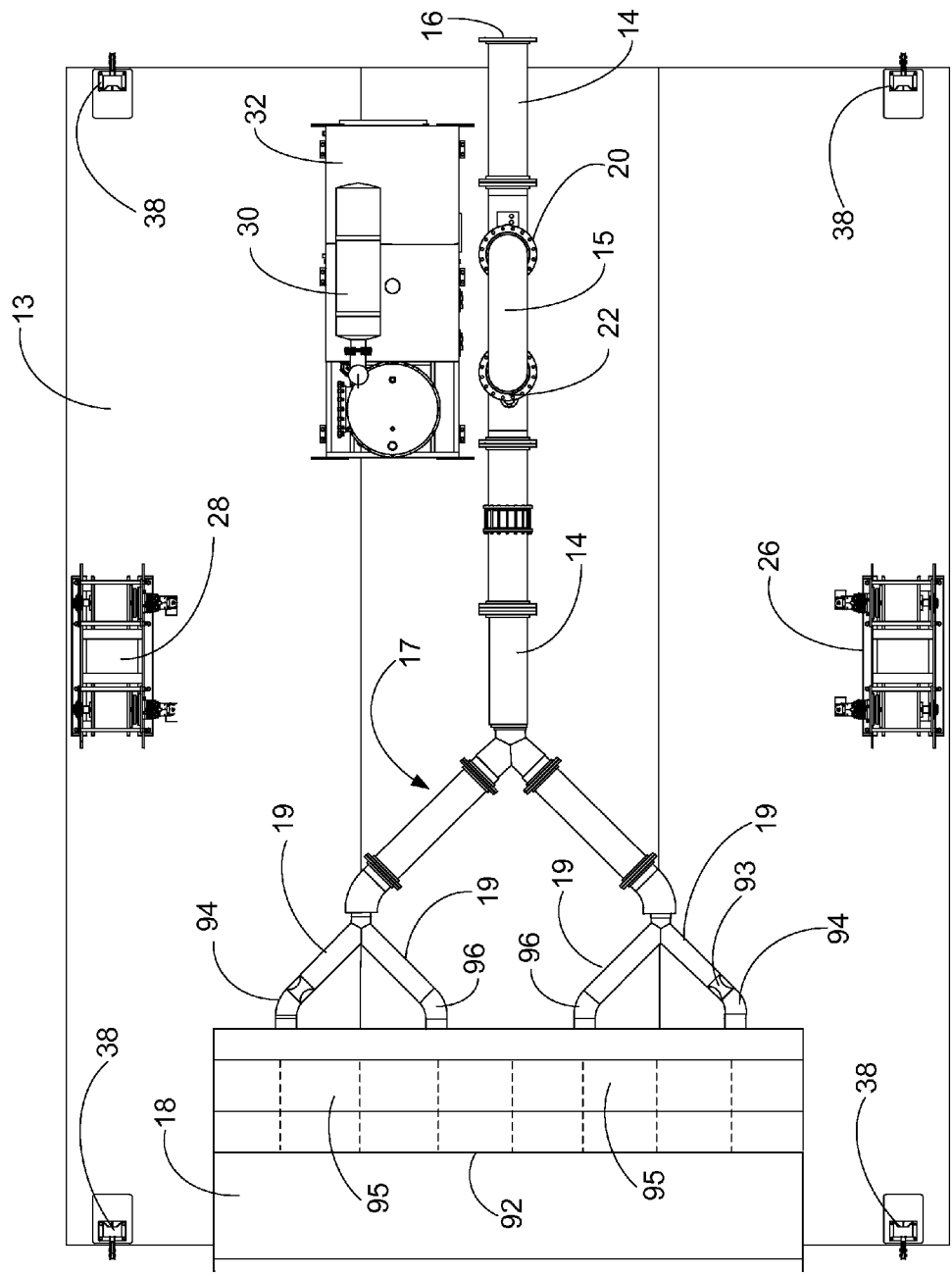
FIG. 6 is a plan view of the barge system for hydraulic spreading of aquatic capping material slurry shown in FIG. 2.

FIG. 6 shows the piping system 14 on the barge 12. The capping material slurry 68 is pumped into the inlet connection 16 on the front end of the barge 12, passes through the U-shaped section 15 and into a manifold 17 that splits the flow of slurry material 68 into a plurality of smaller pipes 19 that are connected at locations across the rear 82 of the spreader 18 to evenly distributed the slurry material 68. Four pipes 19 in the manifold 17 are shown connecting to the spreader 18. However, as one skilled in the art will appreciate, the number of pipes 19 can vary according to the width of the spreader 18 and the invention is not limited by the number of pipes 19 connected to the spreader 18. One or more of the pipes 19 can include a valve 93 for regulating the flow rate.

Figure 7:
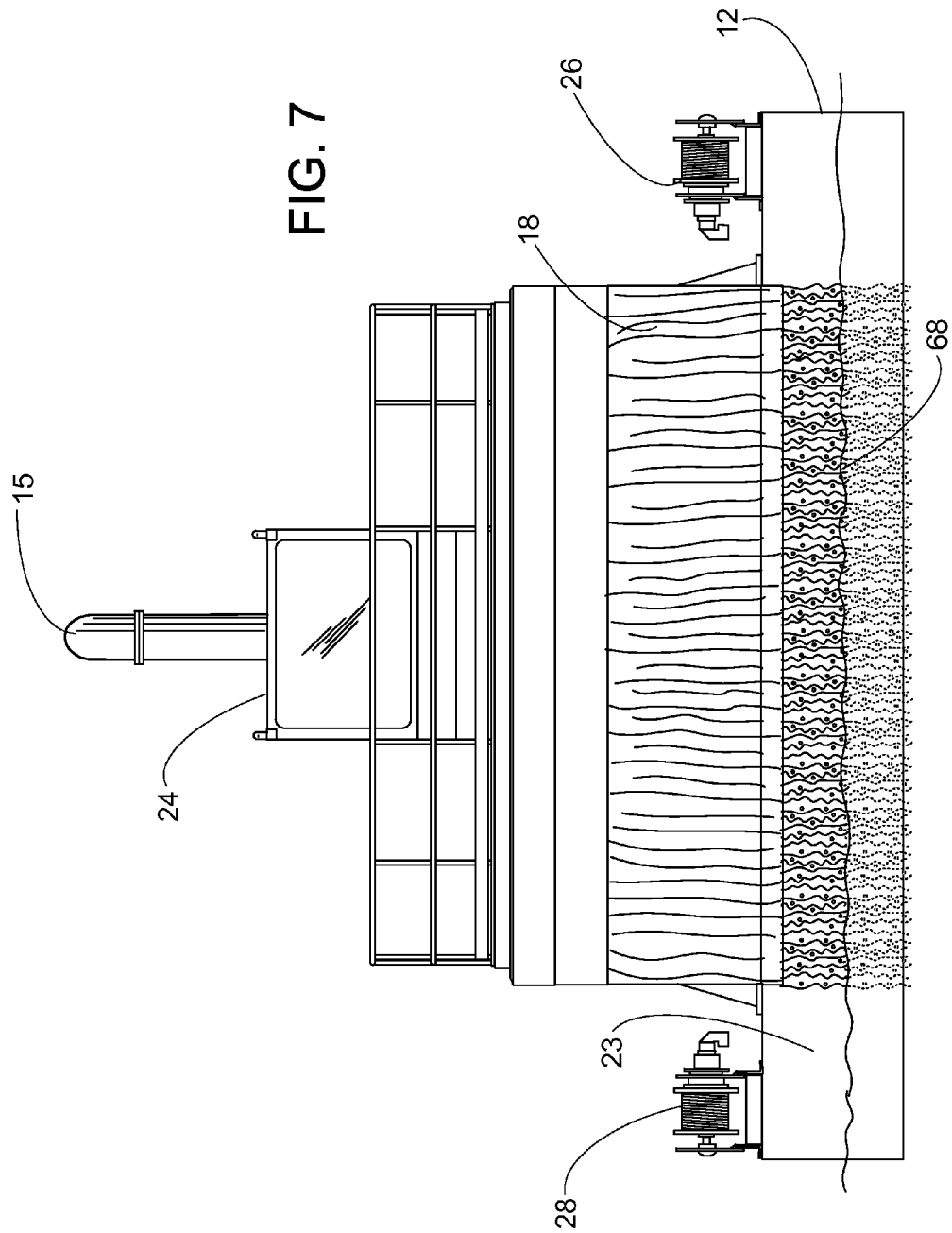
FIG. 7 is a rear view of the barge system for hydraulic spreading of aquatic capping material slurry shown in FIG. 2.

FIG. 7 shows the rear end 23 of the barge 12 with the spreader 18 extending beyond the deck 13 of the barge 12. The control house 24 above the deck 13 of the barge 12 provides a vantage point for the operator to monitor the discharge of capping material slurry 68 from the spreader 18.

Figure 8:
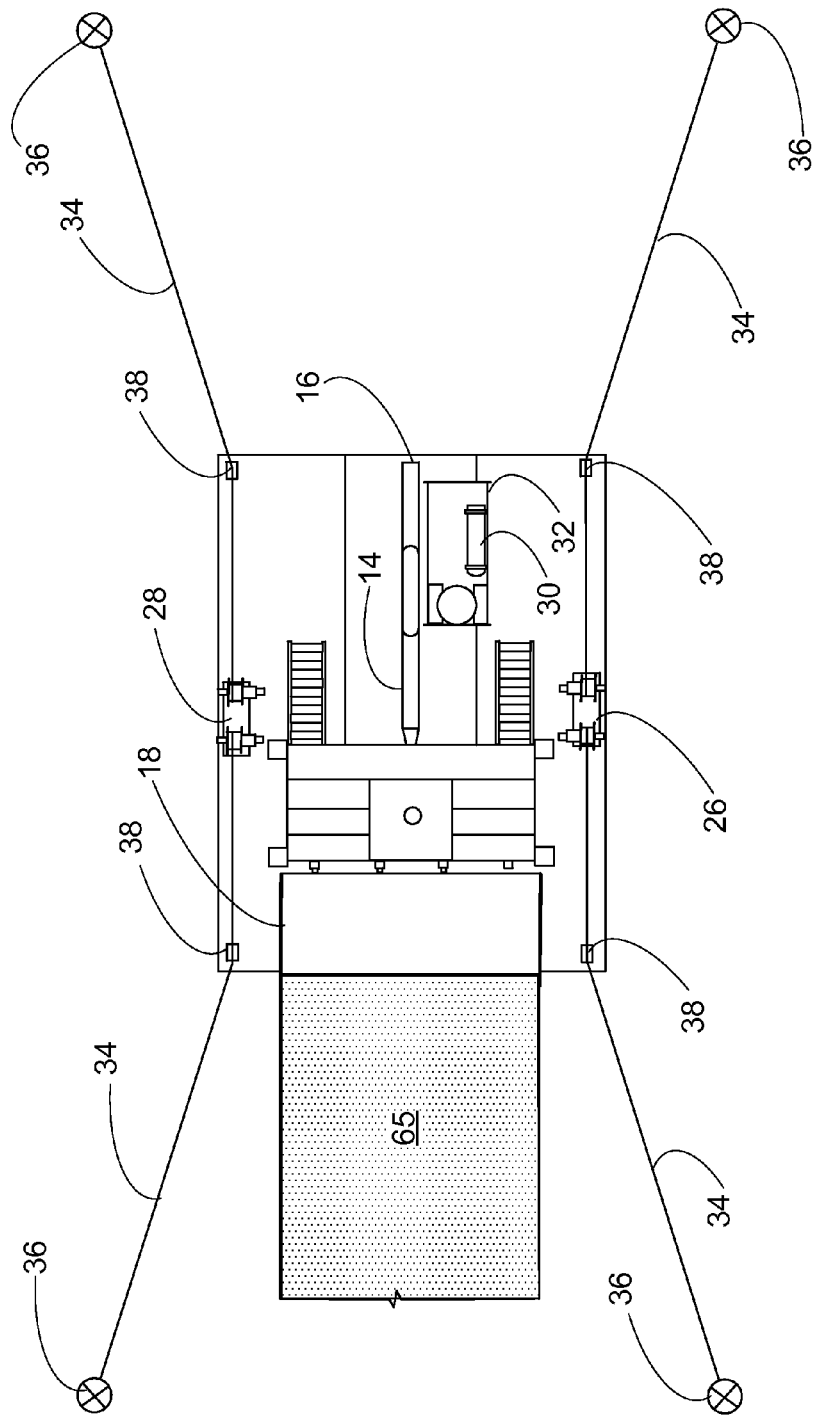
FIG. 8 is a plan view of the barge system for hydraulic spreading of aquatic capping material slurry shown in FIG. 2 showing the winches and cables used to position the barge.

FIG. 8 shows the winches 26, 28 on either side of the barge 12 being used to position the barge 12. Each winch 26, 28 has a cable 34 that is attached to a fixed anchor point 36, such as a piling embedded in the bottom of the body of water, an anchor, a dock or a point on dry ground. The controller 54 sends signals to the hydraulic winches 26, 28 to extend and retract the cables 34 in order to change the position of the barge 12. The operator can set the controller 54 for depositing a predetermined thickness of capping material 65 on the bottom of the body of water or manually change the position of the barge 12. The controller 54 receives the automatic or manual command and moves the barge 12 at a controlled rate of speed based on the amount of slurry material 68 that is being deposited on the bottom of the body of water. Cable guides 38 are located on the barge deck 13 at the four corners and can be pivoted to change the direction of the cables 34. The cable guides 38 allow the barge 12 to be maneuvered using the hydraulic winches 26, 28 to deposit capping material 65 over a wide area of the bottom of the body of water.

Figure 9:
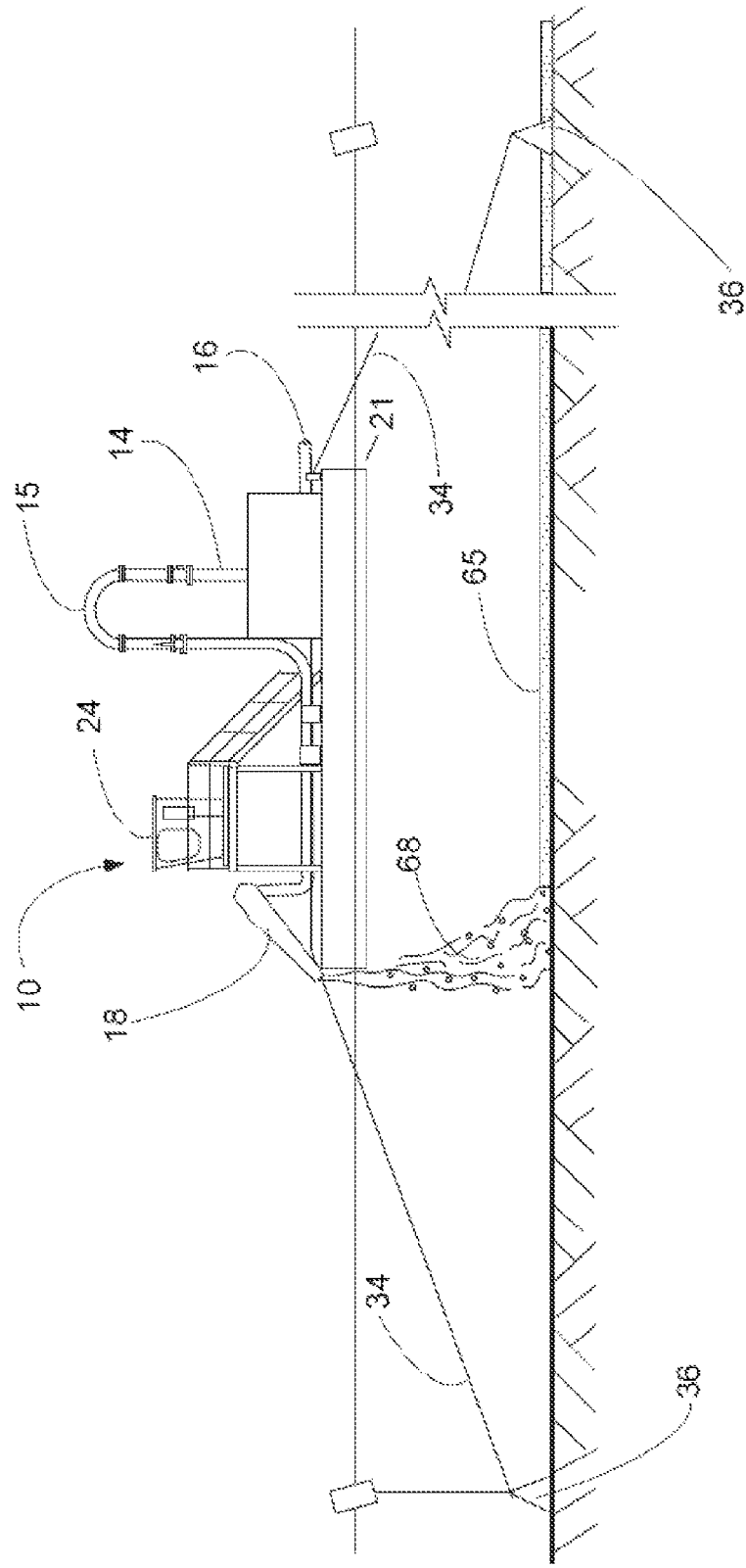
FIG. 9 is a side view of the barge system for hydraulic spreading of aquatic capping material slurry shown in FIG. 8.

FIG. 9 shows the barge 12 operating in a body of water and moving in a backwards direction. The spreader 18 extends over the rear end of the barge 12 and the control house 24 allows the operator to monitor the operation of the barge system 10. The cables 34 are attached to submerged anchor points 36 on the bottom of the body of water. After the barge system 10 has deposited capping material 65 in a defined area bounded by the anchor points 36, the anchor points 36 can be repositioned and moved to another defined area. Typically, the area at the bottom that is being treated forms a grid pattern and the barge system 10 deposits capping material 65 sequentially in each grid until the entire area is completed.

Figure 10:
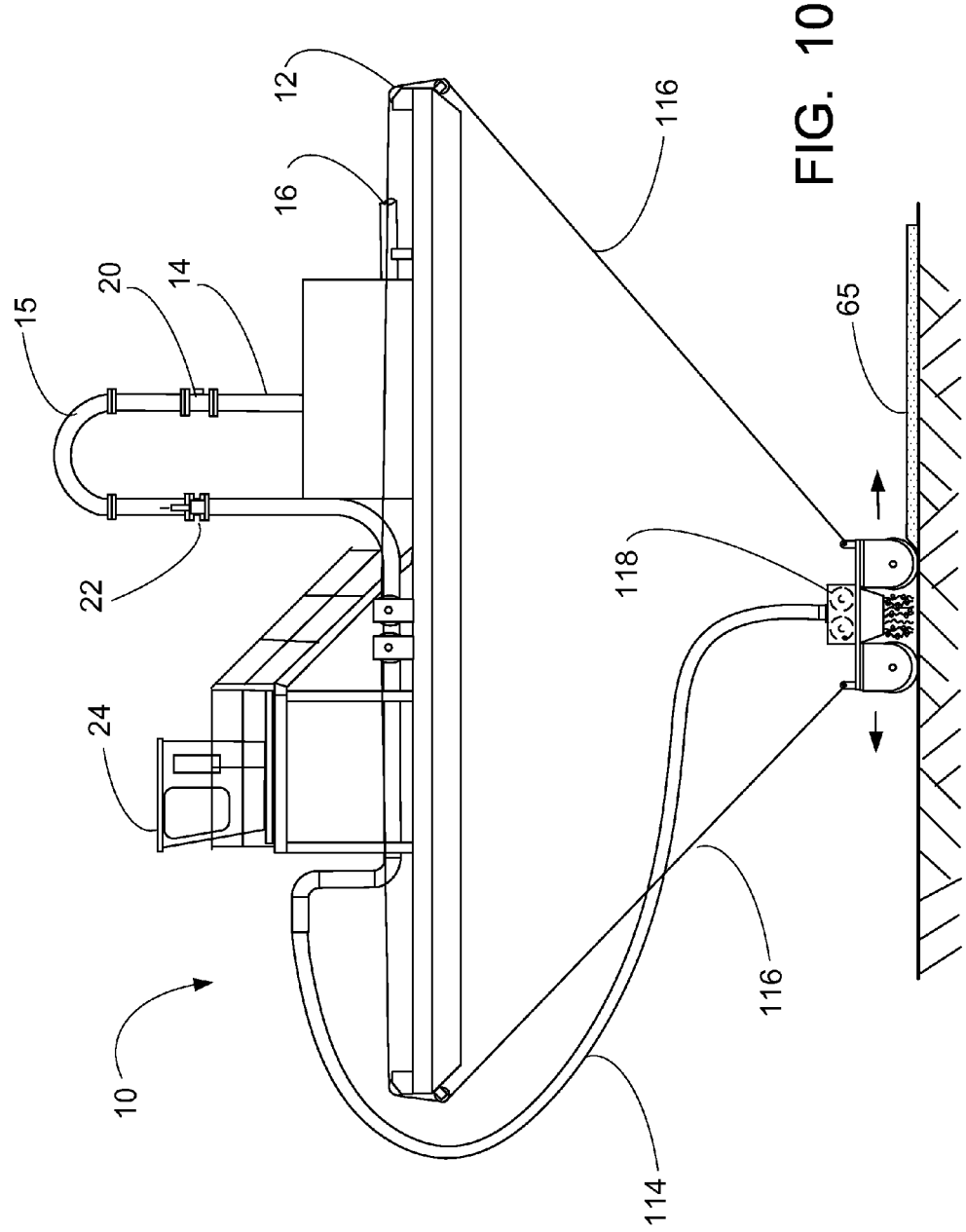
FIG. 10 is a side view of the barge system for hydraulic spreading of aquatic capping material slurry showing an embodiment of the spreader operating at the bottom of a body of water.

FIG. 10 shows an embodiment of the barge system 10 that uses a submerged spreader 118 that moves or is dragged along the bottom of the body of water. One or more flexible pipes 114 acts like an umbilical cord and transports capping material slurry 68 to the spreader 118. One or more cables 116 can be used to tether the spreader 118 to the barge 12 or to drag the spreader 118 across the bottom. In another embodiment, the spreader 118 can move under its own power (as described more fully below) and one or more signal wires can be attached to the cables 116 for sending signals to control the movement of the spreader 118.

Figure 11:
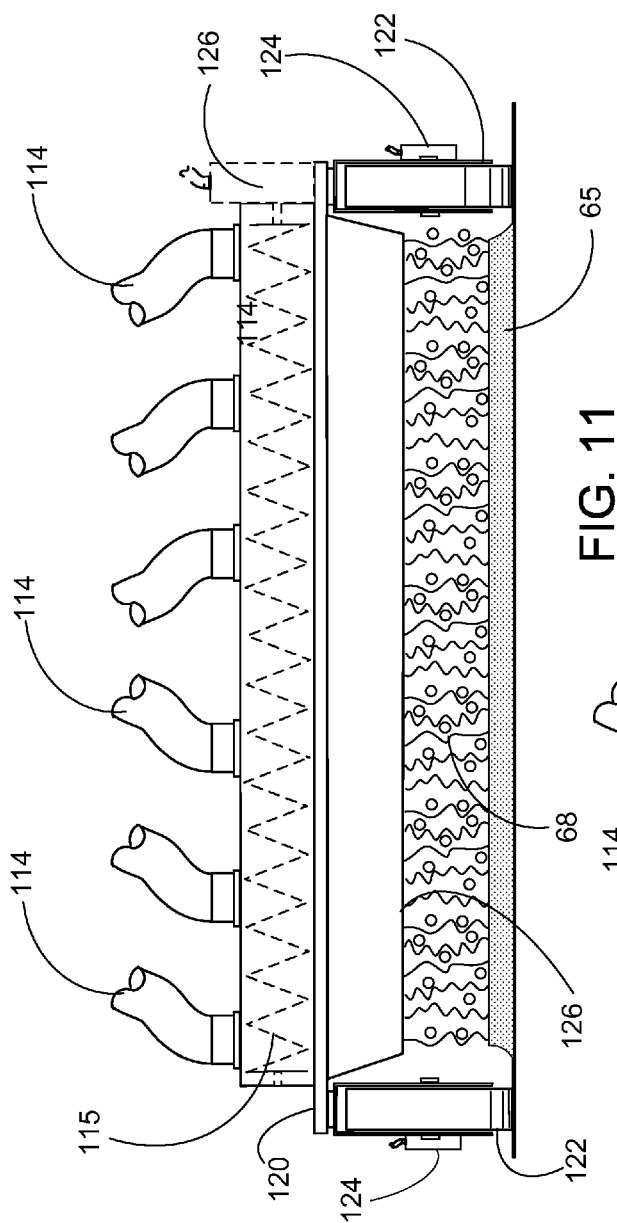
FIG. 11 is a front view of the spreader shown in FIG. 10.
Figure 12:
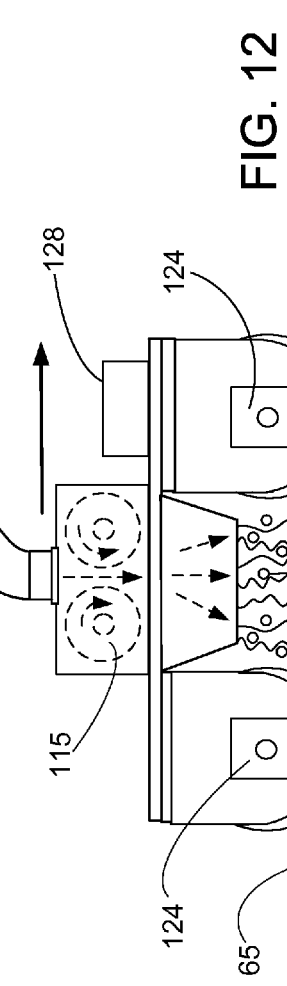
FIG. 12 is a side view of the spreader shown in FIG. 10.

FIGS. 11 and 12 show the front and side of an embodiment of the submerged spreader 118 in FIG. 10. One or more flexible pipes 114 transport slurry material 68 to the spreader 118 and rotors 115 evenly distribute the slurry material 68. The spreader 118 has a chassis 120 and two or more wheels or tracks 122. The propulsion system 124 for the spreader 118 can be one or more pneumatic or electric motors that power the wheels/tracks 122. One or more pneumatic or electric motors 126 are also used to rotate the shaft(s) of the rotors 115 and spread the slurry material 68. An electronic tracking device 128 can be mounted on the spreader 118 to monitor its location. The controller 54 can use the location information to determine the amount of capping material 65 deposited at different locations. The slurry material 68 is discharged through an orifice 126 on the bottom of the chassis 120. The slurry material 68 settles on the bottom of the body of water and forms a layer of capping material 65.

Figure 13:
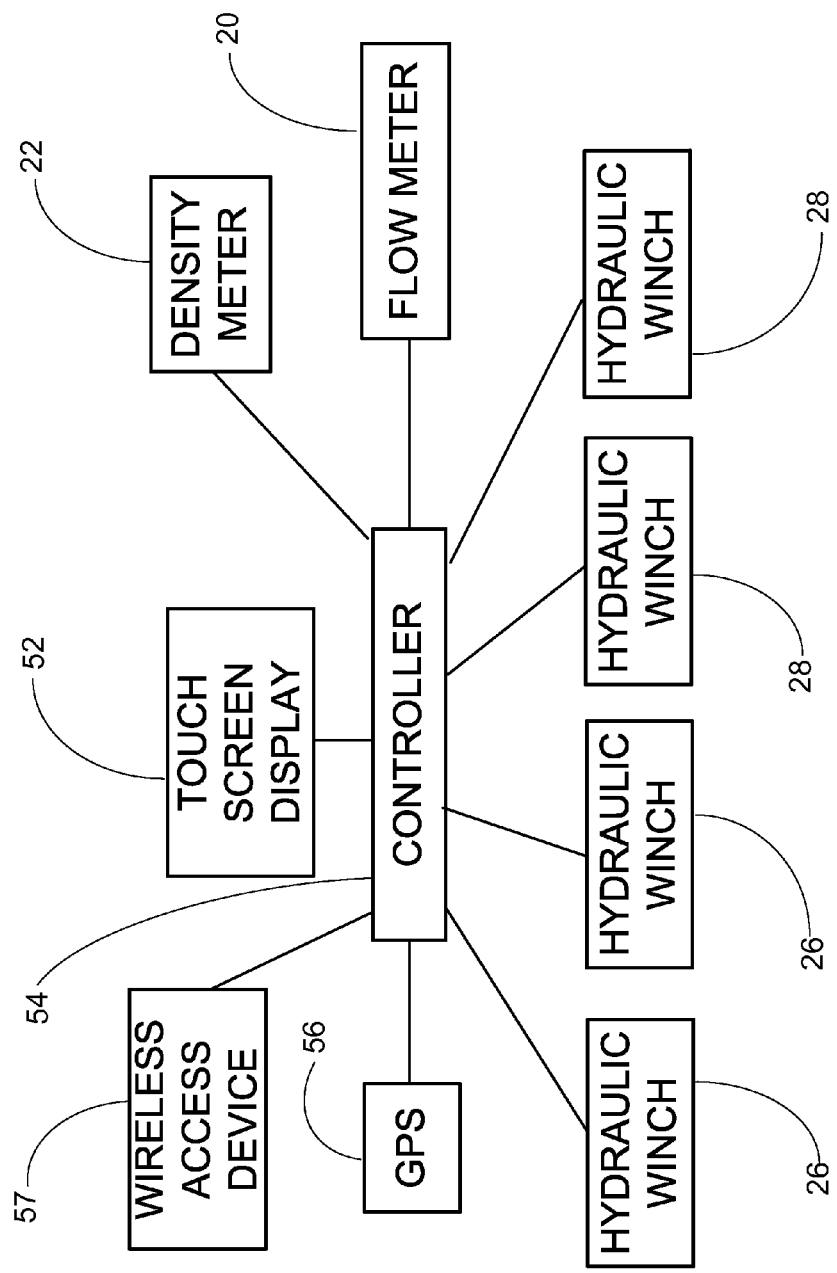
FIG. 13 is a diagram of the controls used to automatically operate the barge system.

FIG. 13 is a diagram of the controls used to automatically operate the barge system 10. The controls include a touch screen 52 and a controller 54. The controller 54 receives input signals from the GPS 56 as well as the flow meter 20 and the density meter 22. A computer program is used to calculate the movement of the barge 12 using the hydraulic winches 26, 28 to deposit a predetermined amount of capping material 65 on the bottom of the body of water. A touch screen display 52 or a wireless access device 57 can be used by the operator to interface with the controller 54 for controlling the barge system 10.

Figure 14:
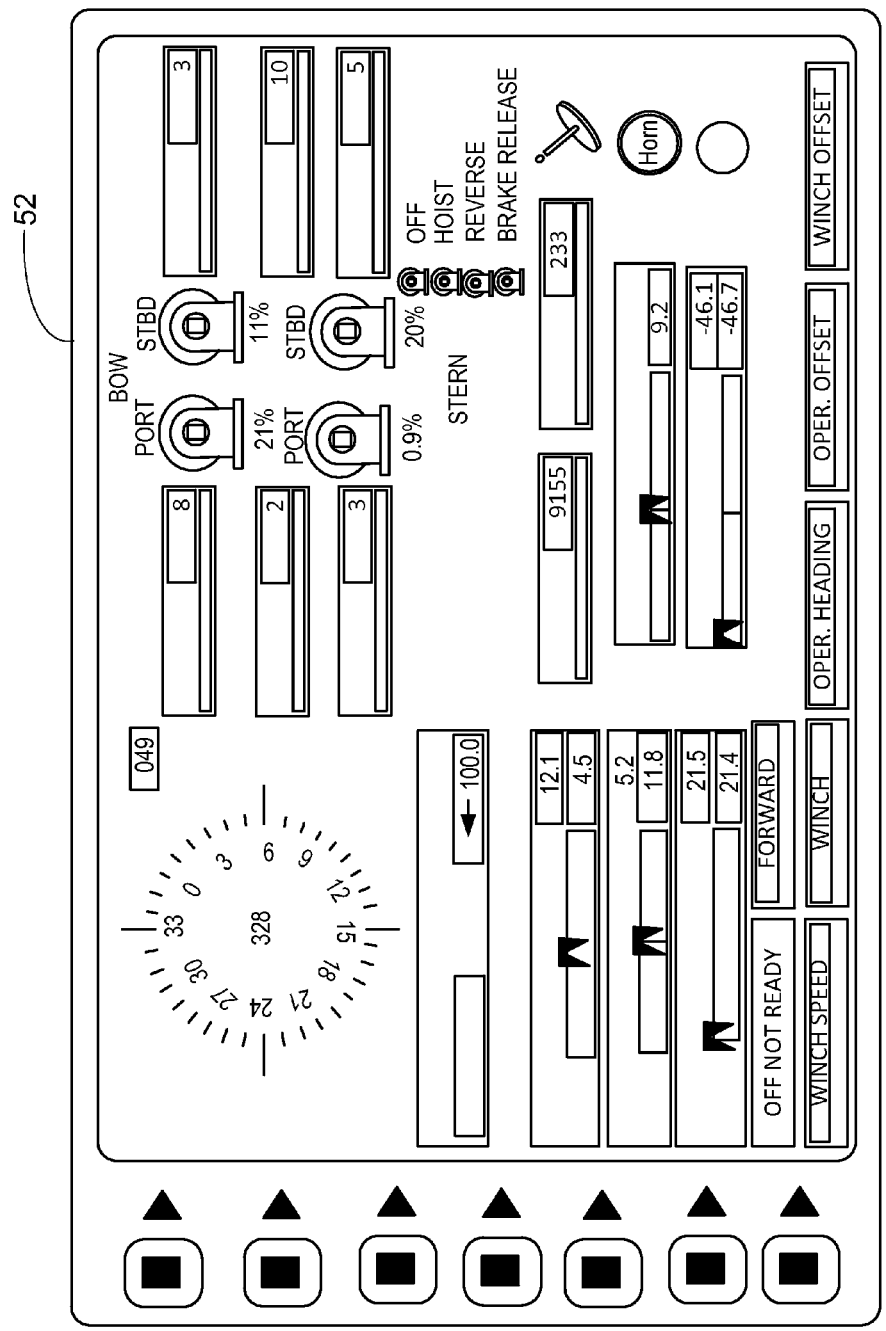
FIG. 14 shows an embodiment of a touch screen display that is used to control the barge system.

FIG. 14 shows an embodiment of the touch screen 52 that is used by the operator to interface with the controller 54. The touch screen 52 shows the basic controls for moving the barge 12 and controlling its speed and direction. More control functionality can be added to control the slurry pumps and the density of the slurry. The touch screen 52 can also be used to monitor the amount of slurry material deposited, the thickness of the slurry material on the bottom of the body of water and the areas in a grid pattern that have been completed. In an alternative embodiment, a touch screen monitor can be provided in place of or in addition to the touch screen 52. The monitor can display the different parameters monitored by the controller, including the slurry flow rate and density, the water current speed and direction, and the speed and position of the barge. A graphical representation of the remediation area with a color-coded display of treated, untreated and work in progress areas can also be shown on the monitor.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:
1. A barge system for spreading capping material on a bottom of a body of water, the barge system comprising:
 a barge, wherein the barge has a deck extending between a front end and a rear end;
 a piping system mounted on the deck of the barge for transmission of a capping material slurry comprising a capping material, the piping system having a first end and a second end, wherein a source of capping material slurry is connected to the first end;
 a spreader having an inlet end in communication with the second end of the piping system and a discharge end, wherein the spreader evenly distributes the capping material slurry;
 a density meter for measuring a density of the capping material slurry in the piping system and transmitting an electronic signal corresponding to the measured density;

a flow meter for measuring a flow rate of the capping material slurry through the piping system and transmitting an electronic signal corresponding to the measured flow rate;

a global positioning system for continuously determining a location of the barge and transmitting an electronic signal corresponding to the location;

a system for moving the barge;

a controller, wherein the controller:
receives the electronic signal from the density meter, the flow meter and the global positioning system;
performs a calculation to determine an amount of capping material slurry discharged from the spreader, wherein the calculation comprises the density and flow rate of the capping material slurry; and
controls the system for moving the barge based on the amount of capping material slurry discharged and the location of the barge as determined by the global positioning system; and an operator interface device for interfacing with the controller, wherein a predetermined thickness of the capping material is deposited on the bottom of the body of water.

2. The barge system according to claim 1, wherein the system for moving the barge comprises a plurality of hydraulic winches for operating cables affixed to immovable objects, wherein retracting and extending the cables using the plurality of winches changes the location of the barge.

3. The barge system according to claim 1, wherein the system for moving the barge comprises one or more propellers connected to one or more inboard or outboard engines.

4. The barge system according to claim 1, wherein the controller comprises software for mapping the body of water, monitoring the location of the barge and recording the amount and location of the capping material deposited on the bottom of the body of water.

5. The barge system according to claim 1, wherein the operator interface device is a touch screen display, a computer monitor and keyboard, a control panel, a laptop computer, a mobile phone or a personal digital assistant.

6. The barge system according to claim 1, wherein the discharge end of the spreader extends from the rear end of the barge.

7. The barge system according to claim 1, wherein the discharge end of the spreader extends from the rear end of the barge and below the surface of the body of water.

8. The barge system according to claim 1, wherein the spreader comprises a chassis for supporting the spreader on the bottom of the body of water.

9. The barge system according to claim 8, wherein the chassis is connected to one or more wheels or tracks.

10. The barge system according to claim 8, wherein the chassis comprises an electric or pneumatic propulsion unit.

11. The barge system according to claim 1, further comprising a piping manifold connecting the second end of the piping system to the inlet end of the spreader.

12. The barge system according to claim 1, wherein the discharge end of the spreader comprises an elongate orifice through which the capping material is discharged.

13. The barge system according to claim 12, wherein the elongate orifice has a width and a height, and wherein the ratio of the width to the height is greater than 4:1.

14. The barge system according to claim 1 further comprising a device for measuring a speed and a direction of a current in the body of water, wherein one or more electronic signals corresponding to the speed and the direction of the current is/are transmitted to the controller.

15. The barge system according to claim 14, wherein the controller calculation for the amount of capping material slurry discharged further comprises the speed and the direction of the current.

16. A barge system for spreading capping material onto a bottom of a body of water, the barge system comprising:
a barge, wherein the barge has a deck extending between a front end and a rear end;
a piping system mounted on the deck of the barge for transmission of a capping material slurry comprising a capping material, the piping system having a first end and a second end, wherein a source of capping material slurry is connected to the first end;
a spreader having an inlet end for receiving the capping material slurry from the second end of the piping system and a discharge end, wherein the spreader distributes the capping material slurry;
a system for moving the barge comprising a plurality of hydraulic winches for operating cables affixed to immovable objects, wherein retracting and extending the cables using the plurality of winches changes the location of the barge;
a controller for controlling the system for moving the barge; and
an operator interface device for interfacing with the controller,
wherein the barge system moves the barge to deposit the capping material onto the bottom of the body of water.

17. The barge system according to claim 16 further comprising:
a density meter for measuring a density of the capping material slurry in the piping system and transmitting an electronic signal corresponding to the measured density to the controller;
a flow meter for measuring a flow rate of the capping material slurry through the piping system and transmitting an electronic signal corresponding to the measured flow rate to the controller;
a device for measuring a speed and a direction of a current in the body of water and transmitting one or more electronic signals corresponding to the speed and the direction of the current; and
a global positioning system for continuously determining a location of the barge and transmitting an electronic signal corresponding to the location to the controller,
wherein the controller:
receives the electronic signals from the density meter, the flow meter, the device for measuring the speed and the direction of the current, and the global positioning system;
performs calculations to determine an amount of capping material slurry discharged from the spreader and an amount of capping material deposited on the bottom of the body of water, wherein the calculation comprises the density and the flow rate of the capping material slurry and the speed and the direction of the current; and
controls the system for moving the barge based on the amount of capping material discharged and the location of the barge as determined by the global positioning system.

18. The barge system according to claim 17, wherein the controller comprises software for mapping the body of water, monitoring the location of the barge and recording the amount and location of the capping material deposited on the bottom of the body of water.

19. The barge system according to claim 17, wherein the operator interface device is a touch screen display, a computer monitor and keyboard, a control panel, a laptop computer, a mobile phone or a personal digital assistant.

20. A barge system for spreading capping material onto a bottom of a body of water, the barge system comprising:
a barge comprising a deck extending between a front end and a rear end and a first side and a second side;
a piping system mounted on the deck of the barge for transmission of a capping material slurry, the piping system having a first end and a second end, wherein a source of capping material slurry is connected to the first end;
a piping manifold comprising an inlet connection and a plurality of discharge connections, wherein the inlet connection is connected to the second end of the piping system;
a spreader comprising a base plate extending between a first end and a second end, a pair of opposing side walls, a top plate that defines an interior and a plurality of inlet connections on the first end connected to the plurality of discharge connections of the piping manifold, wherein the discharge end extends from the front end or rear end of the barge, and wherein the capping material slurry passes through the spreader and is discharged at the second end;
a system for moving the barge;
a controller for controlling the system for moving the barge; and
an operator interface,
wherein the barge is moved to deposit the capping material on the bottom of the body of water.

21. The barge system according to claim 20, wherein the manifold comprises one or more valves for regulating the flow of the capping material slurry to the plurality of discharge connections.

22. The barge system according to claim 20, wherein the second end of the spreader comprises an elongate orifice through which the capping material is discharged.

23. The barge system according to claim 22, wherein the elongate orifice has a width and a height, and wherein the ratio of the width to the height is greater than 4:1.

24. The barge system according to claim 20, wherein the interior of the spreader comprises a plurality of passages extending from the first end to a point intermediate the first end and the second end.

25. A barge system for spreading capping material on a bottom of a body of water, the barge system comprising:
a barge, wherein the barge has a deck extending between a front end and a rear end;
a piping system on the deck of the barge for transmission of a capping material slurry comprising a capping material, the piping system having a first section with a first end, a second section with a second end and a U-shaped intermediate section disposed between the first and second sections, wherein the first and second sections are substantially parallel to the deck and the U-shaped intermediate section extends upwardly from the deck and is substantially perpendicular to the first and second sections, and wherein a source of capping material slurry is connected to the first end;
a spreader comprising a base plate extending between a first end and a second end, a pair of opposing side walls, a top plate that defines an interior, wherein the spreader is connected to the second end of the piping system, wherein the discharge end extends from the front end or rear end of the barge, and wherein the capping material slurry passes through the spreader and is discharged at the second end;
a system for moving the barge, and
a controller,
wherein the barge system deposits a predetermined thickness of the capping material on the bottom of the body of water.

26. The barge system according to claim 25 further comprising:
a density meter for measuring a density of the capping material slurry in the piping system and transmitting an electronic signal corresponding to the measured density;
a flow meter for measuring a flow rate of the capping material slurry through the piping system and transmitting an electronic signal corresponding to the measured flow rate; and
a global positioning system for continuously determining a real time location of the barge and transmitting an electronic signal corresponding to the location.

27. The barge system according to claim 26 further comprising an operator interface device for interfacing with the controller, wherein the controller:
receives the electronic signals from the density meter, the flow meter and the global positioning system;
performs a calculation to determine an amount of capping material slurry discharged from the spreader based on the density and flow rate of the capping material slurry; and
controls the system for moving the barge based on the amount of capping material slurry discharged and the location of the barge as determined by the global positioning system.

28. The barge system according to claim 27 further comprising a device for measuring a speed and a direction of a current in the body of water and transmitting one or more electronic signals corresponding to the speed and the direction of the current to the controller, wherein the controller performs a calculation to determine an amount of capping material deposited on the bottom of the body of water based on the density and flow rate of the capping material slurry and the speed and the direction of the current.

29. The barge system according to claim 26, wherein the density meter and the flow meter are installed in the U-shaped intermediate section.

* * * * *